US009407408B2

(12) United States Patent
Chun et al.

(10) Patent No.: US 9,407,408 B2
(45) Date of Patent: Aug. 2, 2016

(54) METHOD AND APPARATUS FOR BIT MAPPING FOR DOWNLINK CONTROL CHANNEL IN WIRELESS COMMUNICATION SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 377 days.

(21) Appl. No.: 14/234,110

(22) PCT Filed: Jul. 18, 2012

(86) PCT No.: PCT/KR2012/005732
§ 371 (c)(1),
(2), (4) Date: Jan. 21, 2014

(87) PCT Pub. No.: WO2013/015558
PCT Pub. Date: Jan. 31, 2013

(65) Prior Publication Data
US 2014/0161087 A1 Jun. 12, 2014

Related U.S. Application Data

(60) Provisional application No. 61/511,105, filed on Jul. 24, 2011.

(51) Int. Cl.
*H04L 5/00* (2006.01)
*H04L 1/00* (2006.01)
(Continued)

(52) U.S. Cl.
CPC ............ *H04L 5/0046* (2013.01); *H04L 1/0027* (2013.01); *H04L 1/0072* (2013.01);
(Continued)

(58) Field of Classification Search
None
See application file for complete search history.

(56) References Cited

U.S. PATENT DOCUMENTS

| 7,782,749 | B2 * | 8/2010 | Yu | H04B 7/2656 370/204 |
|---|---|---|---|---|
| 2011/0075624 | A1 | 3/2011 | Papasakellariou et al. | |
| 2011/0249633 | A1 * | 10/2011 | Hong | H04L 5/0053 370/329 |

FOREIGN PATENT DOCUMENTS

| KR | 1020090064299 | 6/2009 |
|---|---|---|
| KR | 10-2010-0082289 | 7/2010 |

(Continued)

OTHER PUBLICATIONS

Korean Intellectual Property Office Application Serial No. 10-2014-7001672, Notice of Allowance dated Nov. 18, 2014, 2 pages.
LG Electronics, "Discussions on DL Control Signaling Enhancement", R1-111789, 3GPP TSG RAN WG1 Meeting #65, May 2011, 3 pages.

*Primary Examiner* — Ian N Moore
*Assistant Examiner* — Brian T Le
(74) *Attorney, Agent, or Firm* — Lee, Hong, Degerman, Kang & Waimey; Jonathan Kang; Harry Lee

(57) ABSTRACT

A method and an apparatus for mapping a bit of an enhanced physical downlink control channel (e-PDCCH) in a wireless communication system are provided. A base station maps an e-PDCCH bit on a first region to which the e-PDCCH is allocated from a data region within a subframe, and maps a redundant bit of the e-PDCCH bit on a second region, which is between a control region and the first region within the subframe, including at least one orthogonal frequency division multiplexing symbol (OFDM). The e-PDCCH bit is mapped from a $k^{th}$ OFDM symbol within the subframe in the direction of an increasing OFDM symbol index, and the redundant bit is mapped from a $(k-1)^{th}$ OFDM symbol in the direction of a decreasing OFDM symbol index.

13 Claims, 17 Drawing Sheets

(51) Int. Cl.
*H04L 1/08* (2006.01)
*H04W 72/04* (2009.01)
*H04L 27/00* (2006.01)

(52) U.S. Cl.
CPC ............... *H04L 1/08* (2013.01); *H04L 5/0048* (2013.01); *H04L 5/0053* (2013.01); *H04W 72/042* (2013.01); *H04L 5/001* (2013.01); *H04L 5/0023* (2013.01); *H04L 27/0006* (2013.01)

(56) References Cited

FOREIGN PATENT DOCUMENTS

| | | |
|---|---|---|
| WO | 2010076300 | 7/2010 |
| WO | 2010079890 | 7/2010 |
| WO | 2010087685 | 8/2010 |
| WO | 2011085189 | 7/2011 |

\* cited by examiner

METHOD AND APPARATUS FOR BIT MAPPING FOR DOWNLINK CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2012/005732, filed on Jul. 18, 2012, which claims the benefit of U.S. Provisional Application Ser. No. 61/511,105, filed on Jul. 24, 2011, the contents of which are all hereby incorporated by reference herein in their entirety.

BACKGROUND OF THE INVENTION

1. Field of the Invention

The present invention relates to wireless communications and, more particularly, to a method and apparatus for bit mapping for a downlink control channel in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS. Link quality is expected to be improved by employing the DMNS. However, introduction of a new control channel is also required for application of various MIMO techniques and cooperative techniques to the DMNS.

It is required that a method for allocating a new control channel to the DMNS efficiently.

SUMMARY OF THE INVENTION

The present invention provides a method and apparatus for bit mapping for a downlink control channel in a wireless communication system. The present invention provides a method for mapping an enhanced physical downlink control channel (e-PDCCH) bit and a redundant bit of the e-PDCCH.

In an aspect, a method for mapping, by a base station, a bit of an enhanced physical downlink control channel (e-PDCCH) in a wireless communication system is provided. The method includes mapping an e-PDCCH bit to a first region to which an e-PDCCH is allocated in a data region within a subframe, mapping a redundant bit of the e-PDCCH bit to a second region including at least one orthogonal frequency division multiplexing (OFDM) symbol between a control region and the first region within the subframe, and transmitting the mapped e-PDCCH bit and the redundant bit to a user equipment. The e-PDCCH bit is mapped from a $k^{th}$ OFDM symbol within the subframe in the direction of an increasing OFDM symbol index. The redundant bit is mapped from a $(k-1)^{th}$ OFDM symbol within the subframe in the direction of a decreasing OFDM symbol index.

The redundant bit may be a part or the whole part of the e-PDCCH bit.

The control region may occupy first one to three numbers of the OFDM symbols within the subframe.

k may be 4.

The mapping the e-PDCCH bit may include adding a scrambling sequence to the e-PDCCH bit, generating modulation symbols by performing quadrature phase shift keying (QPSK) modulation on the e-PDCCH bit to which the scrambling sequence is added, performing a layer mapping and precoding on the generated modulation symbols, and mapping the modulation symbols to resource elements.

The mapping the redundant bit may include adding a scrambling sequence to the redundant bit, generating modulations symbol by performing quadrature phase shift keying (QPSK) modulation on the e-PDCCH bit to which the scrambling sequence is added, performing a layer mapping and precoding on the generated modulation symbols, and mapping the modulation symbols to resource elements.

In another aspect, a method for decoding, by a user equipment, an enhanced physical downlink control channel (e-PDCCH) in a wireless communication system is provided. The method includes searching a first region to which an e-PDCCH is allocated in a data region within a subframe, and a second region including at least one orthogonal frequency division multiplexing (OFDM) symbol between a control region and the first region within the subframe, and decoding an e-PDCCH bit and a redundant bit received from the first region and the second region. The e-PDCCH bit is mapped from a $k^{th}$ OFDM symbol within the subframe in the direction of an increasing OFDM symbol index. The redundant bit is mapped from a $(k-1)^{th}$ OFDM symbol within the subframe in the direction of a decreasing OFDM symbol index.

In another aspect, a base station for mapping a bit of an enhanced physical downlink control channel (e-PDCCH) in a wireless communication system is provided. The base station includes a radio frequency (RF) unit for transmitting or receiving a radio signal, and a processor coupled to the RF unit, and configured to map an e-PDCCH bit to a first region to which an e-PDCCH is allocated in a data region within a subframe, ma a redundant bit of the e-PDCCH bit to a second region including at least one orthogonal frequency division multiplexing (OFDM) symbol between a control region and the first region within the subframe, and transmit the mapped e-PDCCH bit and the redundant bit to a user equipment. The e-PDCCH bit is mapped from a $k^{th}$ OFDM symbol within the subframe in the direction of an increasing OFDM symbol index. The redundant bit is mapped from a $(k-1)^{th}$ OFDM symbol within the subframe in the direction of a decreasing OFDM symbol index.

The e-PDCCH which is robust to an error can be provided.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
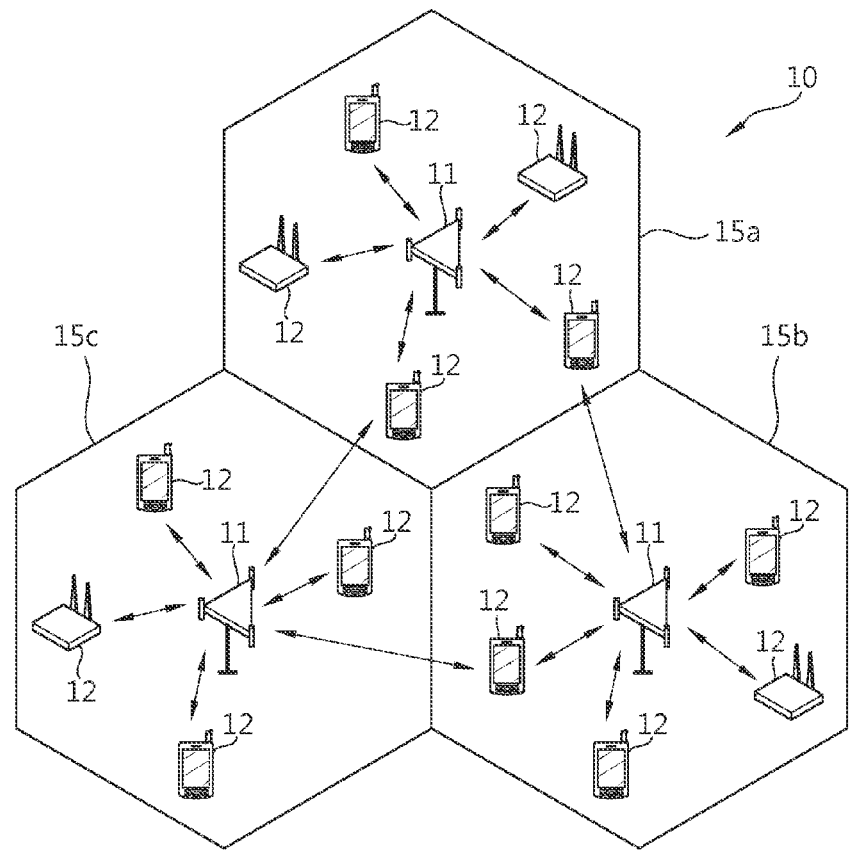
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
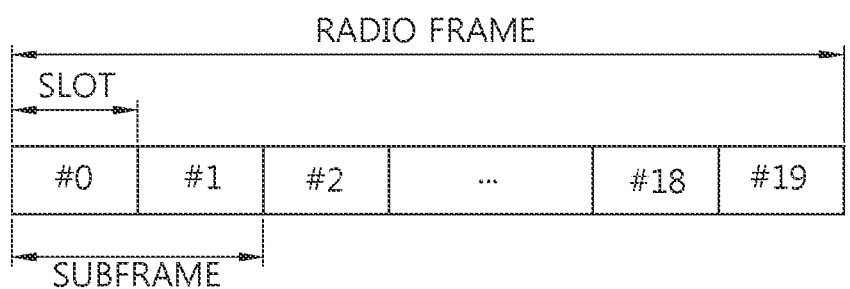
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
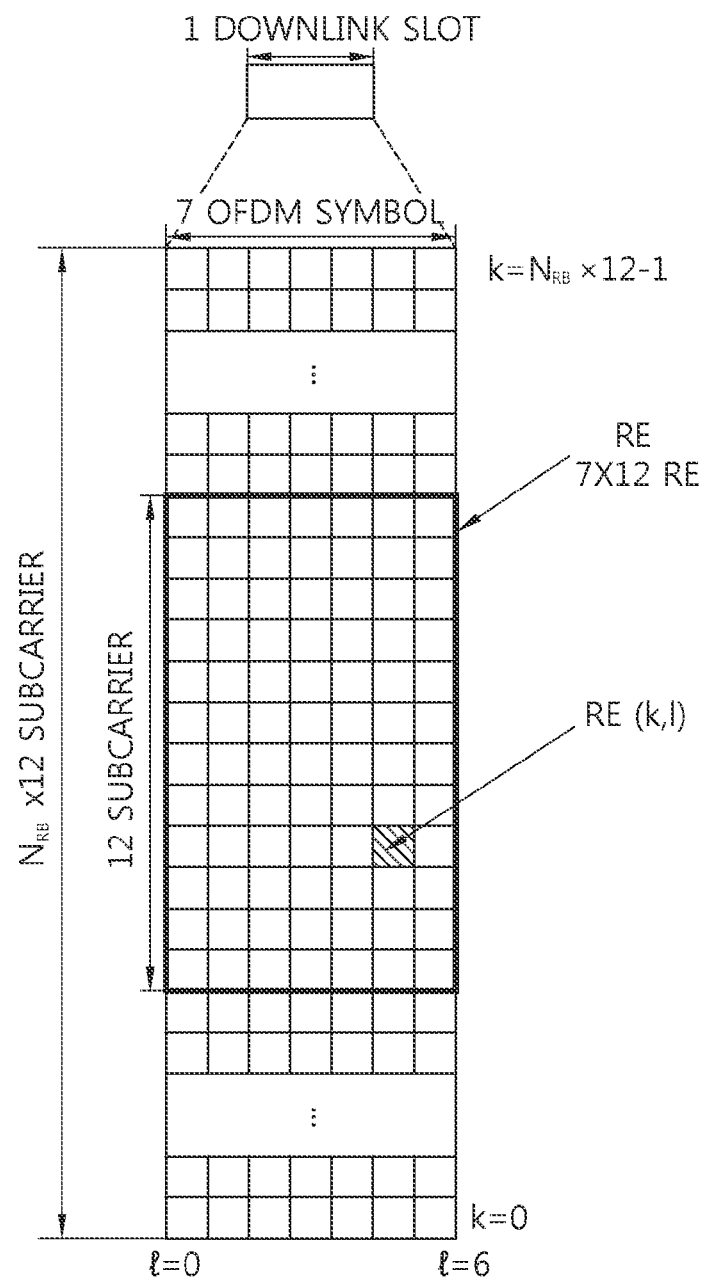
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k= 0, . . . , NRB×12_-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
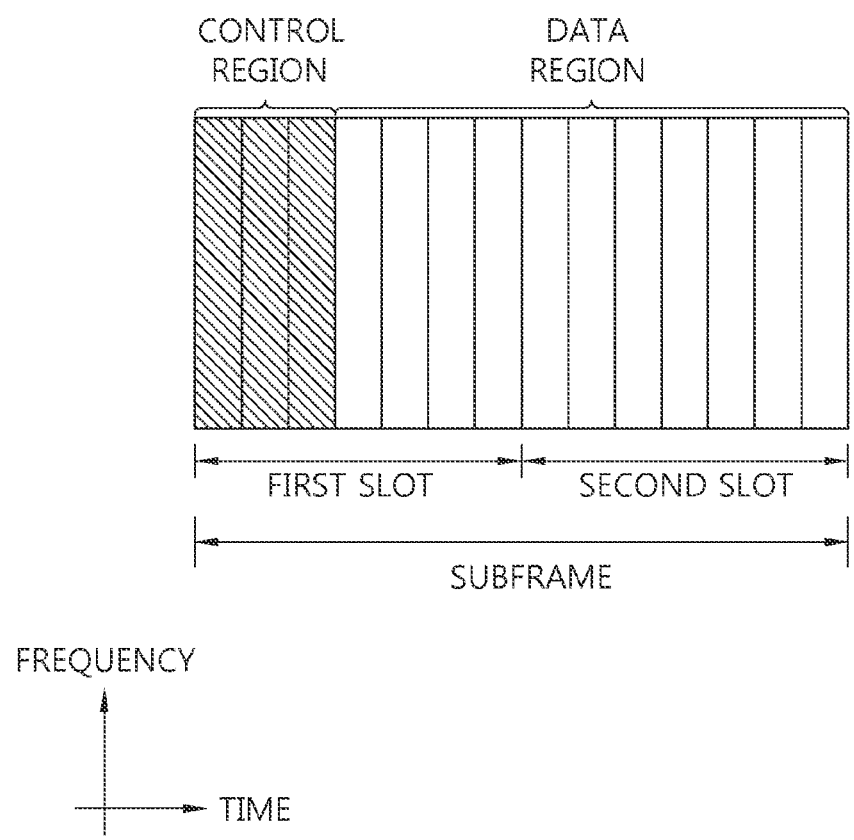
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to nine resource element group (REG) each of them including four resource elements. The four quadrature phase shift keying (QPSK) symbols are mapped to each REG. The resource element occupied by a reference signal (RS) is not included in the REG. The number of REG within given OFDM symbol may be determined on the presence of a cell-specific RS (CRS). According to the correlation of the number of CCEs and the coding rate given by the CCEs, the format of PDCCH and the available bit number of PDCCH are determined. The number of CCE used for transmitting a specific PDCCH may be determined by the base station depending on the channel condition. For example, only one CCE may be used for the PDCCH associated with the UE which is in a good channel condition. However, the PDCCH associated with the UE which is not in a good channel condition may require eight CCEs to obtain enough robustness. In addition, the transmission power of the PDCCH may be adjusted according to the channel condition. Table 1 shows the PDCCH format supported and the number of CCEs that corresponds to each PDCCH format, and so on.

TABLE 1

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
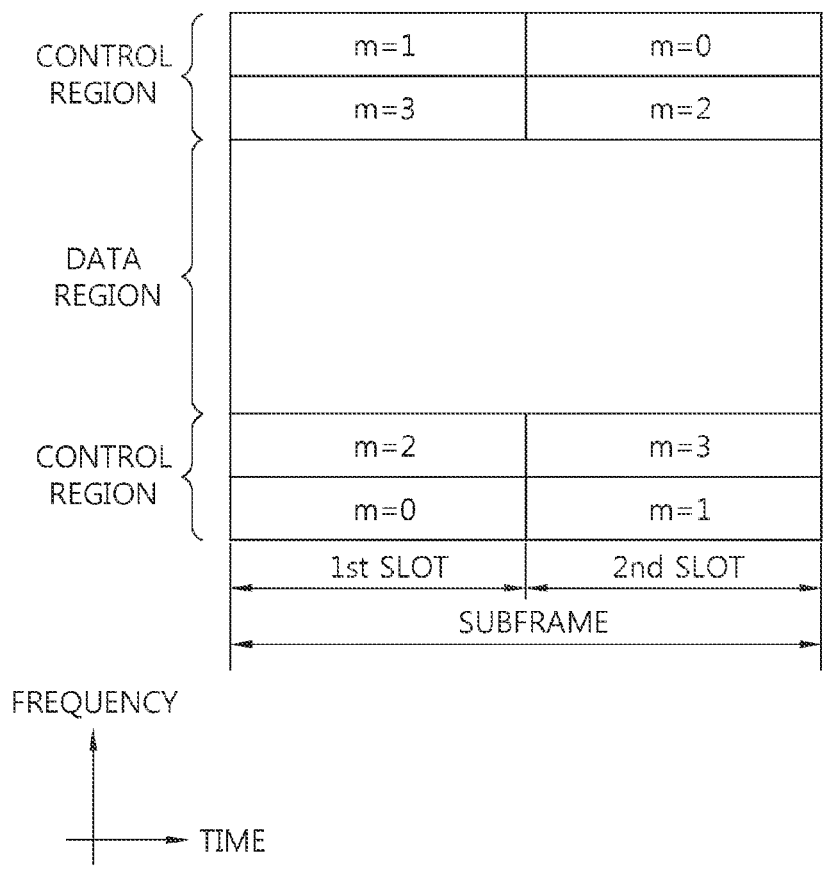
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
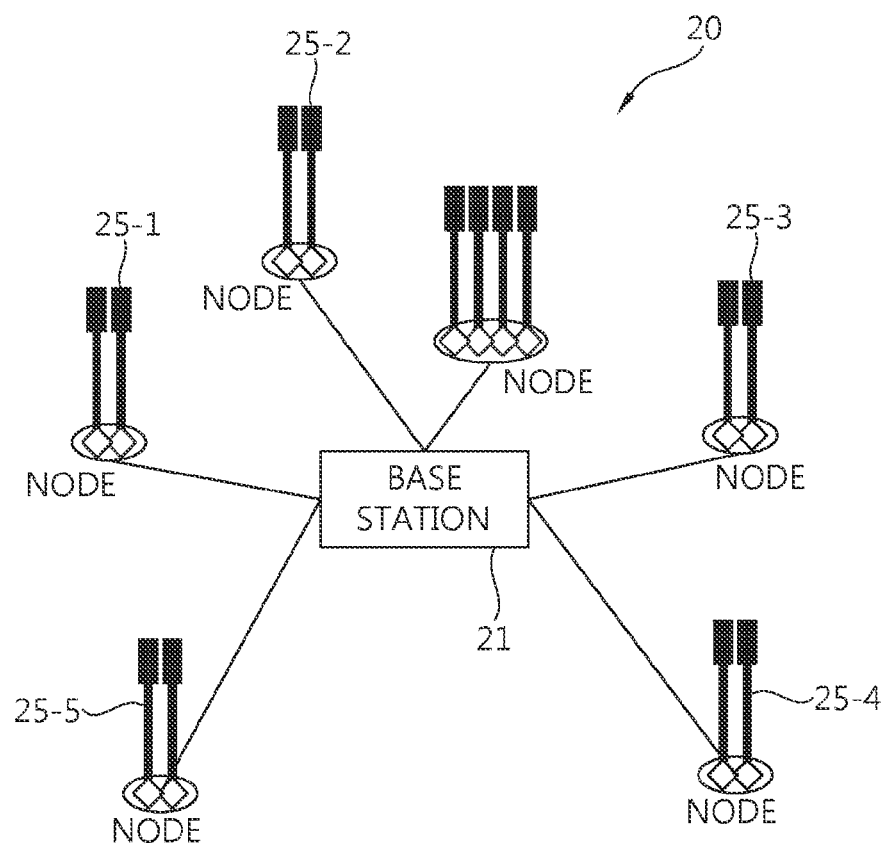
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

Figure 7:
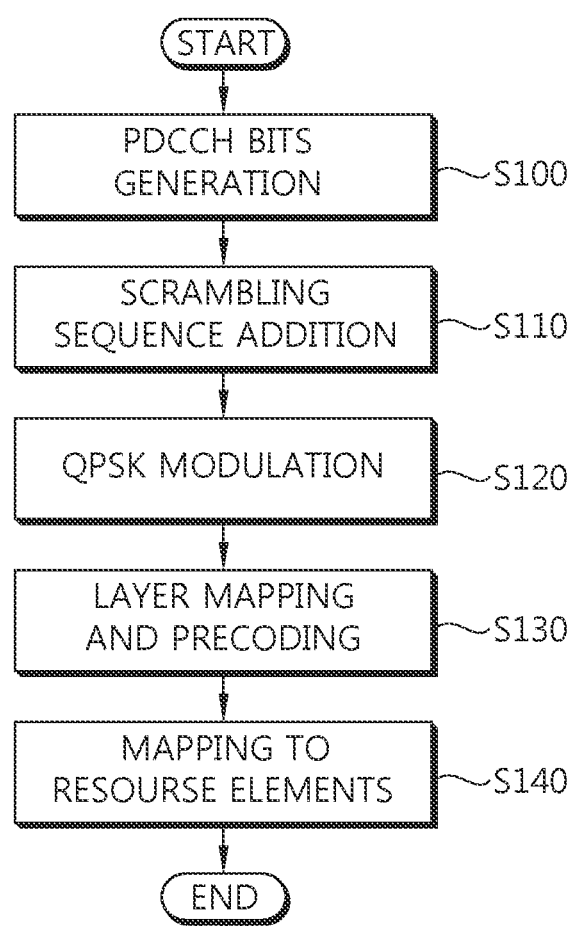
FIG. 7 shows an example of a process in which a PDCCH is mapped to resources.

FIG. 7 shows an example of a process in which a PDCCH is mapped to resources.

In step S100, a PDCCH bit is generated. The PDCCH bit may be denoted by the Equation 1 below.

$$b^{(0)}(0),\ldots,b^{(0)}(M_{bit}^{(0)}-1),b^{(1)}(0),\ldots,b^{(1)}(M_{bit}^{(1)}-1),\ldots,b^{(nPDCCH-1)}(0),\ldots,b^{(nPDCCH-1)}(M_{bit}^{(nPDCCH-1)}-1)$$ <Equation 1>

$M_{bit}^{(i)}$ represents the number of bits transmitted on the number i of the PDCCH within a one subframe. $n_{PDCCH}$ represents the number of PDCCHs transmitted within the subframe.

In step S110, a scrambling sequence is added to the generated PDCCH bit. The PDCCH bit to which the scrambling sequence is added may be denoted by the Equation 2 below.

$$\tilde{b}(0),\ldots,\tilde{b}(M_{tot}-1),\tilde{b}(i)=(b(i)+c(i))\bmod$$ <Equation 2>

In step, S120, QPSK modulation is performed on the PDCCH bit to which the scrambling sequence is added. The modulation symbols generated by the QPSK modulation may be denoted by $d(0),\ldots,d(M_{symb}-1)$.

In step S130, A layer mapping and a precoding are performed on the modulation symbols. The modulation symbols in which the layer mapping and the precoding are performed may be denoted by the Equation 3 below.

$$y(i)=[y^{(0)}(i)\ldots y^{(P-1)}(i)]^T, i=0,\ldots,M_{symb}-1$$ <Equation 3>

In step S140, the modulation symbols in which the layer mapping and the precoding are performed are mapped to resource elements. That is, y(i) in the Equation 3 is mapped to the resources on an antenna port p. After performing the sub-block interleaving, the modulation symbols are mapped to the REGs in the order of time and frequency. The PDCCH is transmitted on a set of antenna port that is identical to the antenna port on which a physical broadcast channel (PBCH) is transmitted.

Figure 8:
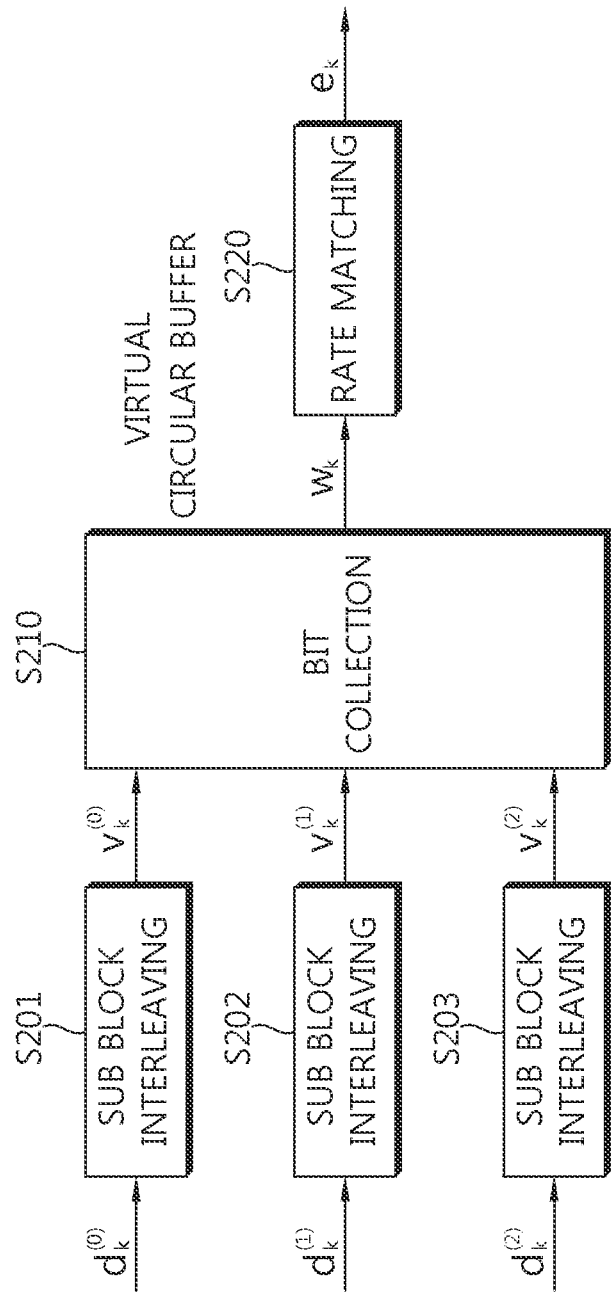
FIG. 8 shows an example of a rate matching process for a convolutionally coded transport channel and control information.

FIG. 8 shows an example of a rate matching process for a convolutionally coded transport channel and control information.

In steps S201, S202 and S203, three bit streams $d_k(0)$, $d_k(1)$ and $d_k(2)$ are interleaved for each subblocks, respectively. As a result of the interleaving performed for the subblocks, $v_k(0)$, $v_k(1)$ and $v_k(2)$ are outputted.

In step S210, the outputs $v_k(0)$, $v_k(1)$ and $v_k(2)$ are collected, and a circular buffer is generated. The length of the circular buffer, $K_w = 3K_\Pi$, and $w_k = v_k(0)$, $w_{k\Pi+k} = v_k(1)$, $w_{2k\Pi+k} = v_k(2)$.

In step S220, a rate matching is performed. When the length of the output sequence of the rate matching is denoted by E, a sequence $e_k$ having length E is outputted as a result of the rate matching.

Hereinafter, a physical control format indicator channel (PCFICH) is described.

Figure 9:
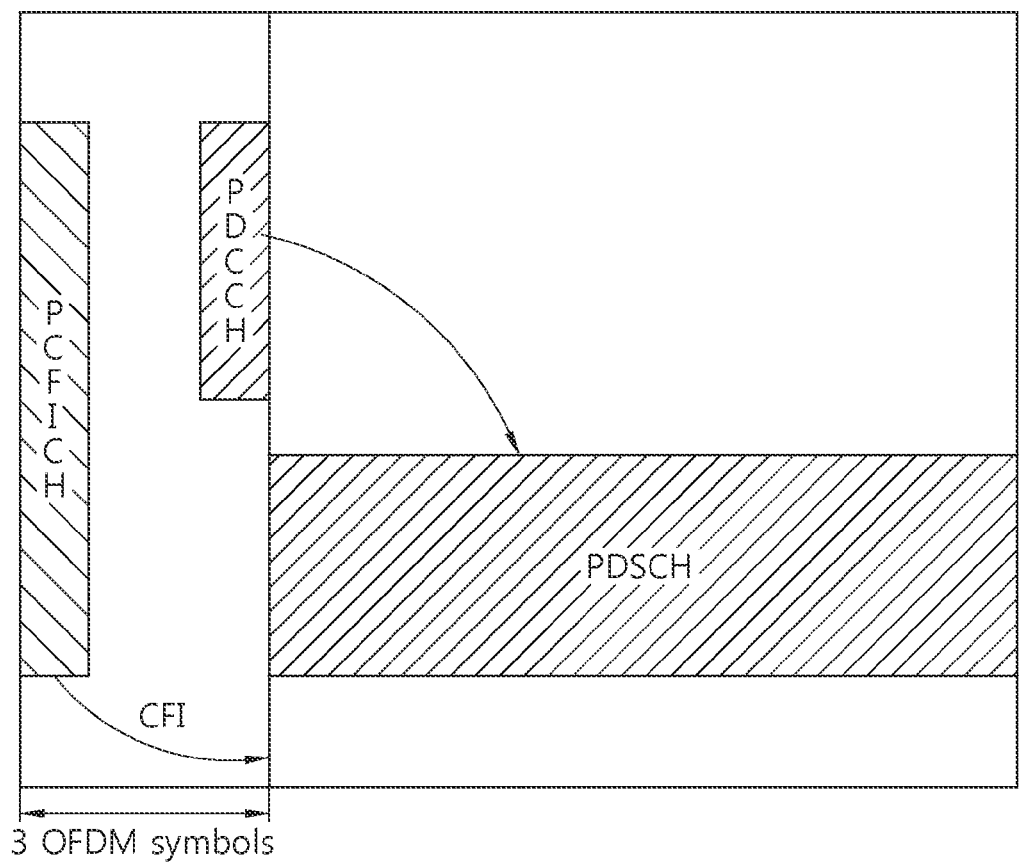
FIG. 9 shows an example where a PCFICH, PDCCH, and PDSCH are mapped to a subframe.

FIG. 9 shows an example where a PCFICH, PDCCH, and PDSCH are mapped to a subframe.

The 3GPP LTE allocates a PDCCH to transmit a downlink control signal intended for controlling user equipments. The region to which PDCCHs of a plurality of user equipments are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the user equipments within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 9, CIF is set to 3, and accordingly, the PDCCH is allocated to the aforementioned three OFDM symbols within a subframe. The user equipment detects its own PDCCH within the control region and finds its own PDSCH through the detected PDCCH in the corresponding control region.

The PDCCH in the prior art was transmitted by using transmission diversity in a confined region and does not employ various techniques supporting the PDSCH such as beamforming, multi-user multiple-input multiple-output (MU-MIMO), and best band selection. Also, in case a distributed multi-node system is introduced for system performance enhancement, capacity of the PDCCH becomes short if cell IDs of a plurality of nodes or a plurality of RRHs are identical to each other. Therefore, a new control channel may be introduced in addition to the existing PDCCH. In what follows, a control channel newly defined is called an enhanced PDCCH (e-PDCCH). The e-PDCCH may be allocated in a data region rather than the existing control region. As the e-PDCCH is defined, a control signal for each node is transmitted for each user equipment, and the problem of shortage of the PDCCH region can be solved.

As the control region to which the PDCCH is allocated is specified by the PCFICH, a new channel specifying a region to which the e-PDCCH is allocated may be defined. In other words, an enhanced PCFICH (e-PCFICH) may be newly defined, which specifies a region to which the e-PDCCH is allocated. The e-PCFICH may carry part or all of information required for detecting the e-PDCCH. The e-PDCCH may be allocated to a common search space (CSS) within the existing control region or a data region.

Figure 10:
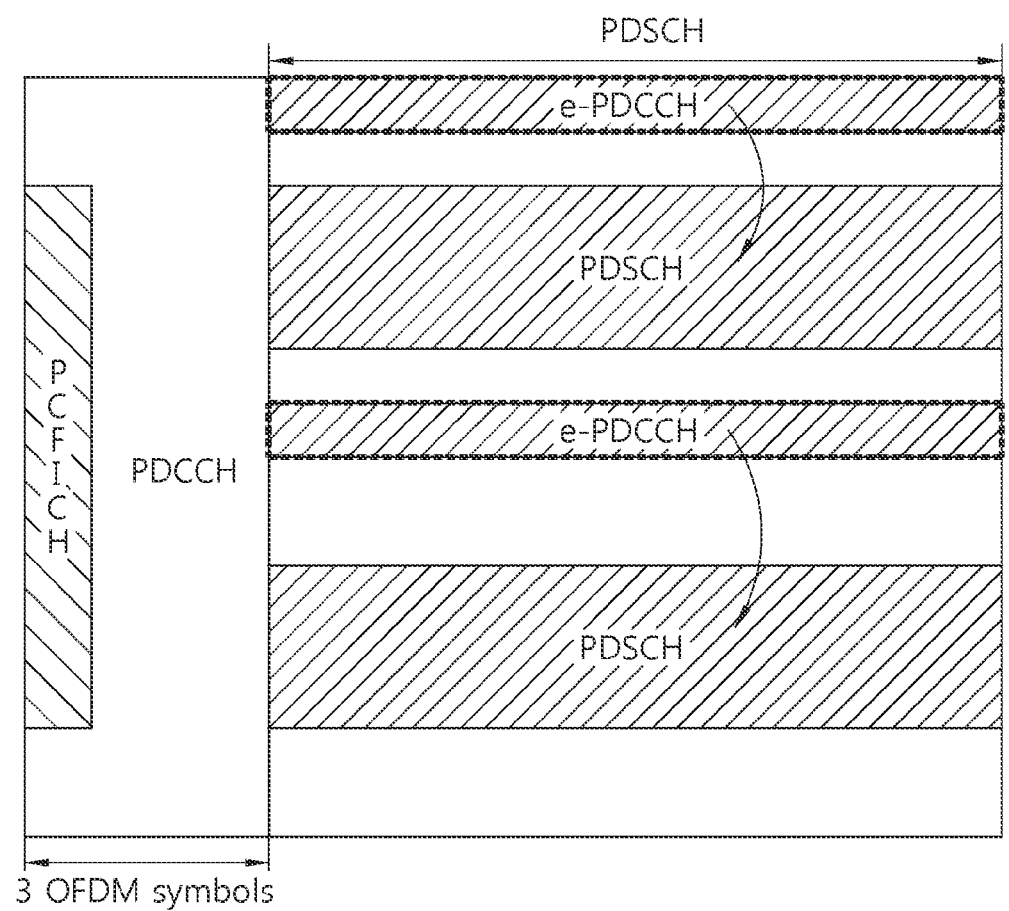
FIG. 10 shows an example of resource allocation through an e-PDCCH.

FIG. 10 shows an example of resource allocation through an e-PDCCH.

The e-PDCCH may be allocated to part of a data region rather than the conventional control region. The e-PDCCH is not provided for the existing legacy user equipments, and those user equipments supporting the 3GPP LTE rel-11 (in what follows, they are called rel-11 user equipments) may search for the e-PDCCH. The rel-11 user equipment performs blind decoding for detection of its own e-PDCCH. The information about the minimum region required for detection of the e-PDCCH may be transmitted through a newly defined e-PCFICH or the existing PDCCH. A PDSCH may be scheduled by the e-PDCCH allocated to the data region. A base station may transmit downlink data to each user equipment through the scheduled PDSCH. However, if the number of user equipments connected to each node is increased, the portion of the data region occupied by the e-PDCCH is enlarged. Therefore, the number of blind decoding that has to be performed by the user equipment is also increased, thus increasing degree of complexity.

Meanwhile, wireless communication systems including relay stations are under development recently. A relay station is intended to extend cell coverage and improve transmission performance. A base station may achieve an effect of extending cell coverage by servicing UEs located at the boundaries of the base station through the relay station. Also, as the relay station improves reliability of signal transmission between the base station and UEs, transmission capacity may be increased. The relay station may be utilized in such a case where a UE is located in a shadow region though the UE may stay within coverage of the base station. The uplink and the downlink between the base station and the relay station are backhaul links while the uplink and the downlink between the base station and a UE, or between the relay station and a UE are access links. Hereinafter, a signal transmitted through the backhaul link is called a backhaul signal, and a signal transmitted through the access link is called an access signal.

Relay zones may be defined in a wireless communication system including relay stations. A relay zone refers to an interval within a downlink subframe transmitted by a base station, where transmission of a control channel (hereinafter, R-PDCCH) for a relay station or transmission of a data channel (hereinafter, R-PDSCH) for the relay station is performed. In other words, the relay zone indicates an interval within a downlink subframe, where backhaul transmission is performed. Transmission between the base station and the relay station is restricted only in the relay zone within a slot. A PDSCH for transmission between the base station and the relay station is processed in the same way as the PDSCH is processed when the relay station is not employed, and the processed PDSCH is mapped to resource elements. However, the corresponding PDSCH is mapped only to the resource elements within the relay region, and if the R-PDCCH is allocated to a first slot of an RB pair, the corresponding PDSCH is not mapped to the first slot of the RB pair.

The R-PDCCH carries DCI for the relay station. The R-PDCCH may be allocated to OFDM symbols of a first slot ranging from the fourth to the last OFDM symbol or OFDM symbols of a second slot ranging from the first to the last OFDM symbol. In frequency domain, a plurality of VRBs to which the R-PDCCH can be allocated may be configured by a higher layer. Without being cross-interleaved with other R-PDCCHs in a given PRB, the R-PDCCH may be transmitted on one or more PRBs. In other cases, a plurality of R-PDCCHs may be cross-interleaved with each other in one or more PRBs.

Figure 11:
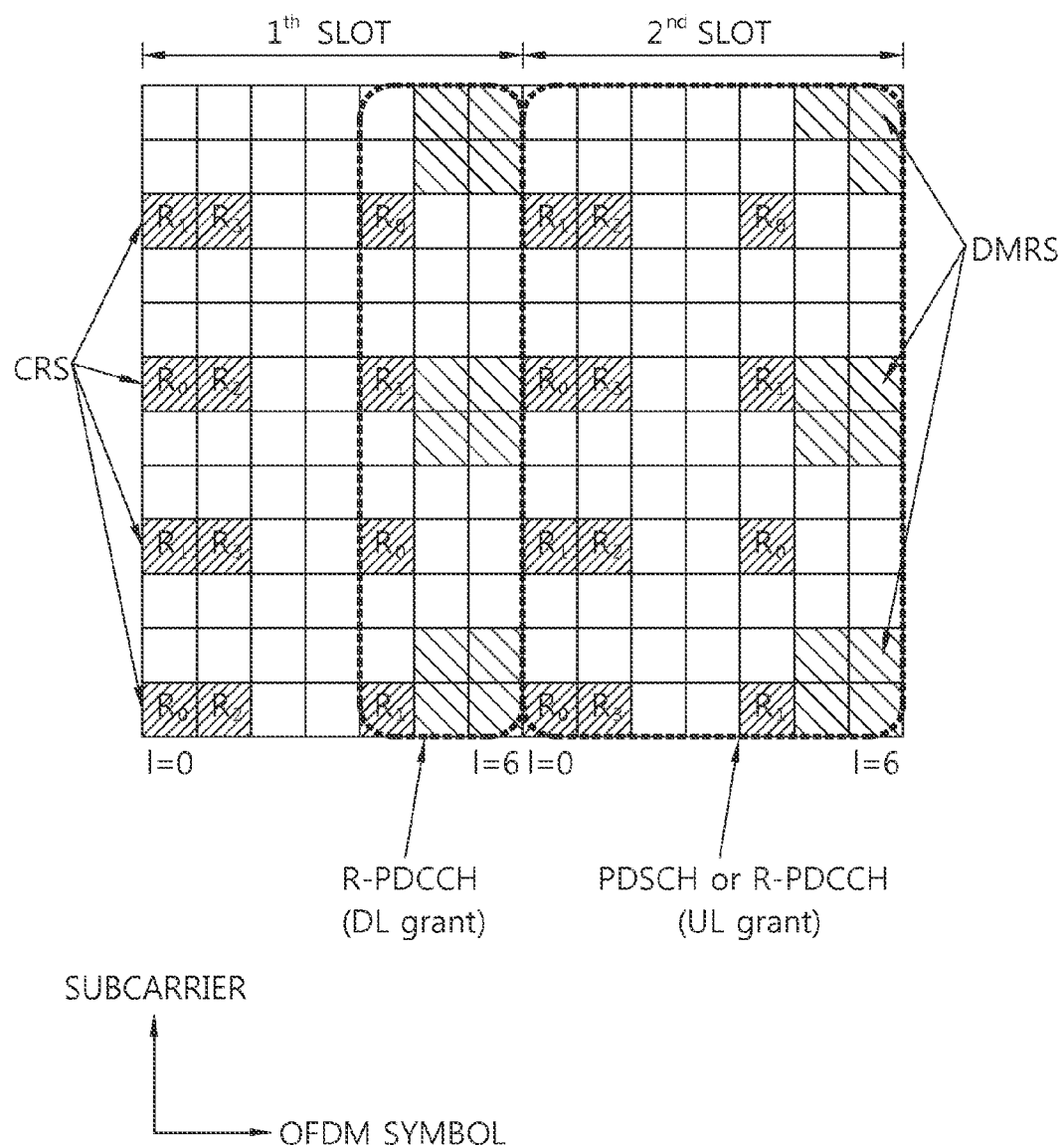
FIG. 11 shows an example of an R-PDCCH allocated to an RB.

FIG. 11 shows an example of an R-PDCCH allocated to an RB.

Referring to FIG. 11, only a DL grant is allocated to a first slot of the RB, and a UL grant or a PDSCH is allocated to a second slot. In this case, the R-PDCCH may be allocated to the remaining REs other than the REs to which a control region, CRS, and DMRS are mapped. Both of the CRS and DMRS may be used for demodulation of the R-PDCCH. If the DMRS is used for demodulation of the R-PDCCH, the antenna port 7 and a scrambling ID (SCID) of 0 may be used. On the other hand, if the CRS is used for demodulation of the R-PDCCH, the antenna port 0 may be used when only one PBCH transmission antenna is employed, whereas if two or four PBCH transmission antennas are used, Tx diversity mode is activated, and antenna ports 0-1 or 0-3 may be utilized.

Figure 14:
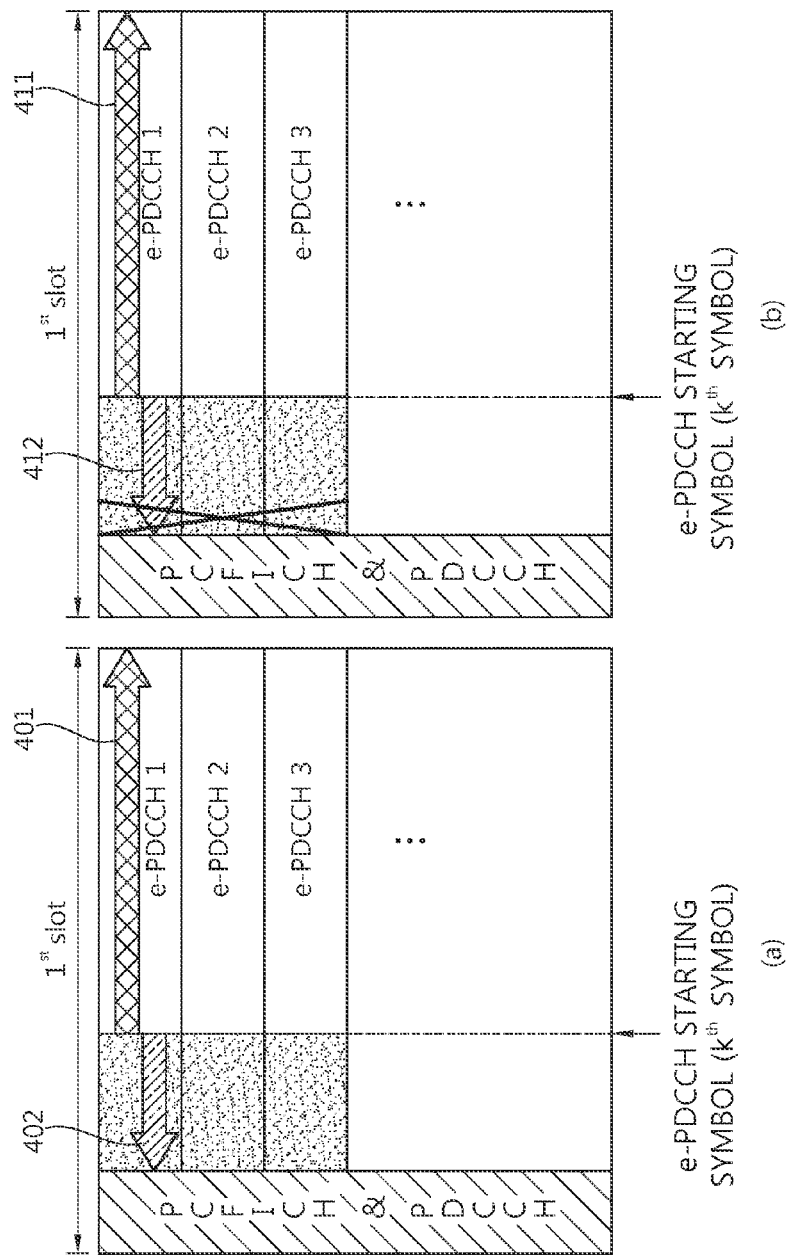
FIG. 14 shows an example of a subframe to which an e-PDCCH is allocated according to a proposed method for bit mapping for an e-PDCCH.

In allocating an e-PDCCH newly defined for a multi-node system, the structure of the existing R-PDCCH described in FIG. 14 may be re-used. In other words, only the DL grant may be allocated to the first slot in the RB, and the UL grant or the PDSCH may be allocated in the second slot. Also, the e-PDCCH may be allocated to the remaining REs other than the REs to which the control region, CRS, and DMRS are mapped. By adopting the existing structure, the e-PDCCH may be allocated without exerting a large influence on the existing standards.

Hereinafter, a proposed method for the bit mapping for the e-PDCCH is described.

When the e-PDCCH uses the structure to which the R-PDCCH is allocated as it is, the e-PDCCH may be allocated to the first slot within the data region. In this case, the e-PDCCH may be allocated either to only the first slot or to both of the first slot and the second slot. Since a few OFDM symbols of the beginning part of the first slot are used for the control region, it may be necessary that the e-PDCCH is allocated to keep out of the control region. The number of the OFDM symbols used for the control region may change according to the subframe, and the information may be indicated by the CFI transmitted through the PCFICH.

The e-PDCCH may allocated from the next OFDM symbol of the last OFDM symbol which is occupied by the control region. That is, the OFDM symbol which the e-PDCCH starts may be identical to the OFDM symbol which the PDSCH starts. However, if the OFDM symbol which the e-PDCCH starts is identical to the OFDM symbol which the PDSCH starts, a decoding error on the PCFICH may cause a decoding error on the e-PDCCH. For example, if the UE may wrongly decode that the CFI is 3 of the case that the CFI is 2 and the e-PDCCH is started from the third OFDM symbol, the UE determines that the e-PDCCH begins from the fourth OFDM symbol, and may wrongly decode the e-PDCCH. Accordingly, it is preferable to set up the OFDM symbol which the e-PDCCH starts in the way of being independent to the CFI. That is, the OFDM symbol to which the e-PDCCH is allocated may be fixed. For example, the e-PDCCH may be allocated from the last OFDM symbol of the allocated slot within the slot to which the e-PDCCH is allocated in the direction of the decreasing OFDM symbol index. Otherwise, the e-PDCCH may be allocated from a fixed starting OFDM symbol in the direction of the increasing OFDM symbol index.

Figure 12:
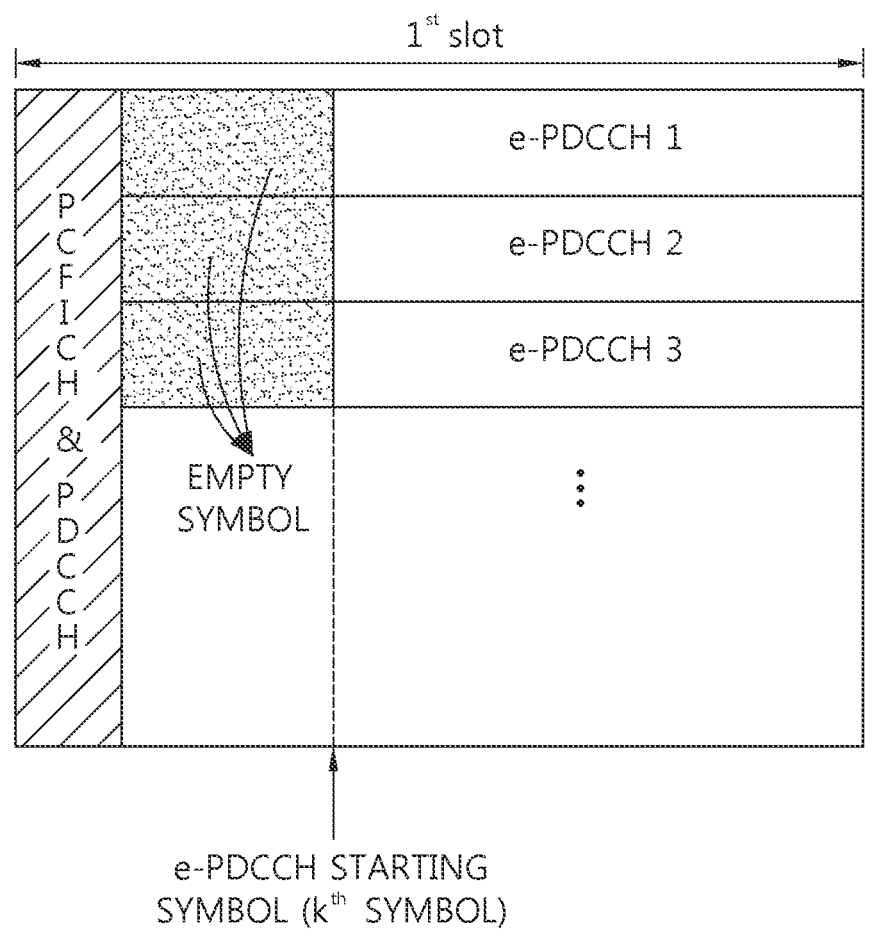
FIG. 12 shows an example of a subframe to which an e-PDCCH is allocated.

FIG. 12 shows an example of a subframe to which an e-PDCCH is allocated.

The e-PDCCH is allocated from the $k^{th}$ OFDM symbol regardless of the CFI. FIG. 12 shows that three e-PDCCHs (e-PDCCH 1, e-PDCCH 2 and e-PDCCH 3) are allocated from the $k^{th}$ OFDM symbol. The value of k may be predetermined, or may be indicated by a radio resource control (RRC) message, and so on. When the value of the CFI is smaller than the value of k, no signal may be transmitted through the OFDM symbol between the control region and the region to which the e-PDCCH is allocated. For example, when CIF=2 and k=4, the third OFDM symbol is remained as an empty OFDM symbol.

The empty OFDM symbol described above may be used for a robust e-PDCCH. The UE may decode the e-PDCCH merely by reading the region to which the e-PDCCH is allocated, but may improve the performance of decoding by using the empty OFDM symbol if the channel condition is not good. That is, the empty OFDM symbol may be used for a redundant region. The redundant bit which is a part of the e-PDCCH bit transmitted through the e-PDCCH may be mapped to the redundant region. The UE may improve the performance by lowering the coding rate by reading the redundant region as well as the region to which the e-PDCCH is allocated. For example, when the rate matching is performed, the redundant bit may be added by increasing the value of E, which corresponds to a length of the output sequence of the rate matching.

Figure 13:
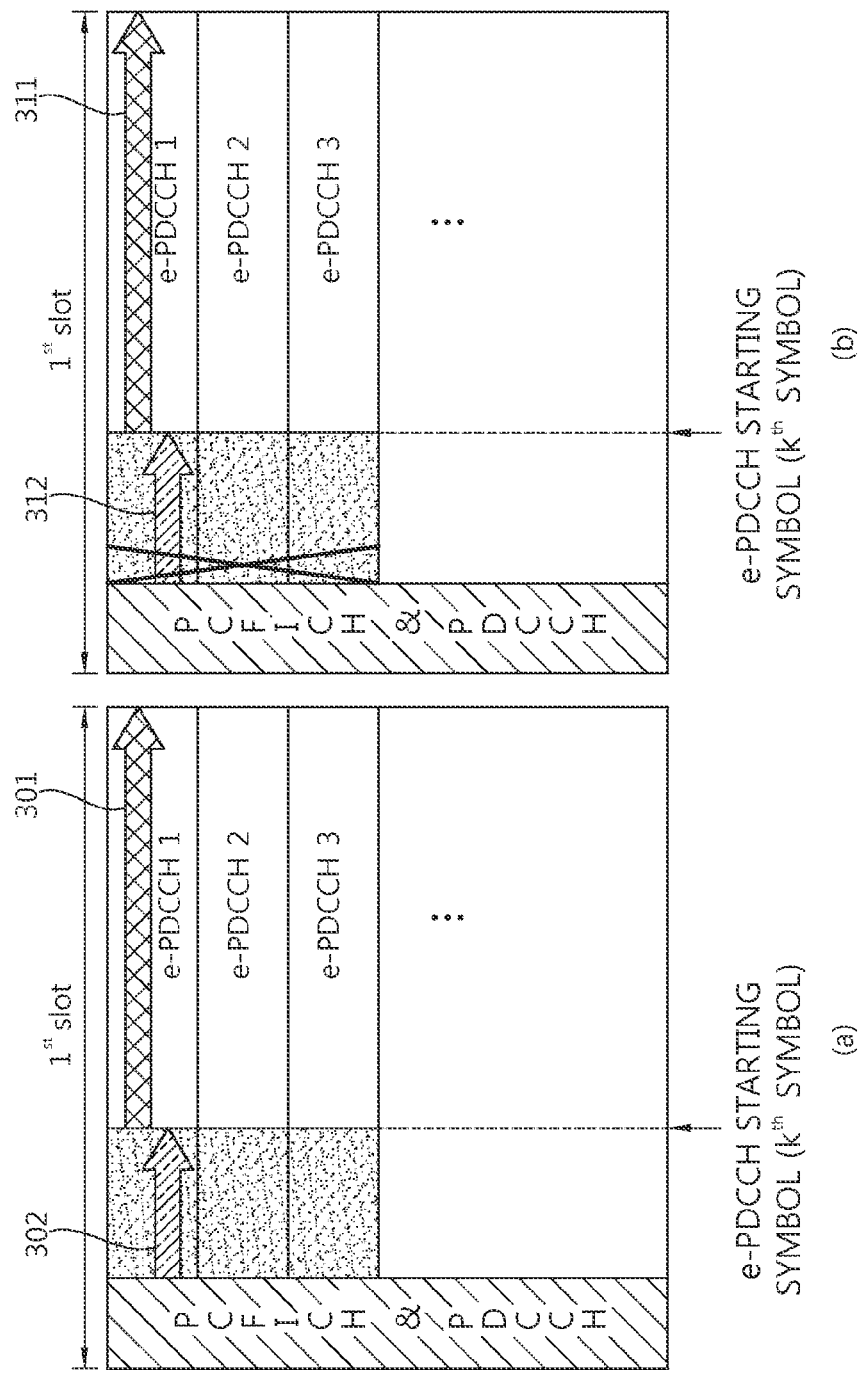
FIG. 13 shows another example of a subframe to which an e-PDCCH is allocated.

FIG. 13 shows another example of a subframe to which an e-PDCCH is allocated.

Referring to FIG. 13-(a), the data bit of the e-PDCCH is allocated to the first region (as shown by the arrow, 301). The first region may be the region to which the e-PDCCH is allocated. The data bit of the e-PDCCH is mapped from the $k^{th}$ OFDM symbol in the direction of the increasing OFDM symbol index. In addition, the redundant bit which is a part of the e-PDCCH is allocated to a second region (as shown by the arrow, 302). The second region indicates the empty OFDM symbol between the control region and the first region. The redundant bit is mapped from the OFDM symbol at the end of the control region to the $k^{th}$ OFDM symbol in which the e-PDCCH begins. In this case, the mapping of the data bit of the e-PDCCH or the redundant bit means performing the process in which the PDCCH is mapped to resources elements as described in FIG. 7. That is, the data bit of the e-PDCCH or the redundant bit is modulated by QPSK modulation, and may be mapped to the resource elements through the layer mapping and the precoding. Hereinafter, the detailed description about the process will be omitted.

As shown in FIG. 13-(a), when the redundant bit is mapped from the last OFDM symbol within the control region to the first OFDM symbol within the e-PDCCH region in the direction of the increasing OFDM symbol index, the redundant bit may be decoded improperly. Referring to FIG. 13-(b), the data bit of the e-PDCCH is allocated to the first region (as shown by the arrow, 311). In addition, the redundant bit which is a part of the data bit of the e-PDCCH is allocated to the second region (as shown by the arrow, 312). The redundant bit is mapped from the OFDM symbol at the end of the control region to the $k^{th}$ OFDM symbol in which the e-PDCCH begins. In this time, the UE may improperly decode the CFI. For example, when CFI=1 and k=4, and the second region corresponds to the second and the third OFDM symbols, the UE may decode improperly as CFI=2. In this case, the UE is unable to read the redundant bit which is mapped to the second OFDM symbol, and may perform decoding of the e-PDCCH under the wrong determination that the first redundant bit is mapped to the third OFDM symbol. Accordingly, there may be no merit in utilizing the redundant bit.

FIG. 14 shows an example of a subframe to which an e-PDCCH is allocated according to a proposed method for bit mapping for an e-PDCCH.

Referring to FIG. 14-(a), the data bit of the e-PDCCH is allocated to the first region (as shown by the arrow, 401). The data bit of the e-PDCCH is mapped from the $k^{th}$ OFDM symbol in which the e-PDCCH begins in the direction of the increasing OFDM symbol index. In addition, the redundant bit as a part of the e-PDCCH data bit is allocated to the second region (as shown by the arrow, 402). The second region indicates an empty OFDM symbol between the control region and the first region. The redundant bit is mapped from the first OFDM symbol of the e-PDCCH to the last OFDM symbol within the control region in the direction of the decreasing OFDM symbol index. That is, the redundant bit of the e-PDCCH data bit may be reversely mapped from the $(k-1)^{th}$ OFDM symbol to the last OFDM symbol within the control region. Accordingly, the OFDM symbol which the redundant bit starts is always fixed.

As shown in FIG. 14-(a), when the redundant bit is mapped to from the $(k-1)^{th}$ OFDM symbol to the last OFDM symbol within the control region in the direction of the decreasing OFDM symbol index, an error which the redundant bit is improperly decoded does not occur even in case of the CFI being wrongly decoded by the UE. Referring to FIG. 14-(b), the data bit of the e-PDCCH is allocated to the first region (as shown by the arrow, 411). In addition, the redundant bit as a part of the e-PDCCH data bit is allocated to the second region (as shown by the arrow, 412). The redundant bit is mapped from the first OFDM symbol of the e-PDCCH to the last OFDM symbol within the control region in the direction of the decreasing OFDM symbol index. In this case, the UE may improperly decode the CFI. For example, when CFI=1 and k=4, and the second region corresponds to the second and the third OFDM symbols, the UE may decode improperly as CFI=2. Even in this case, while the number of the redundant bit is only decreased, the UE determines the redundant bit which is mapped to the third OFDM symbol as the first redundant bit, and may utilize the redundant bit in decoding.

Figure 15:
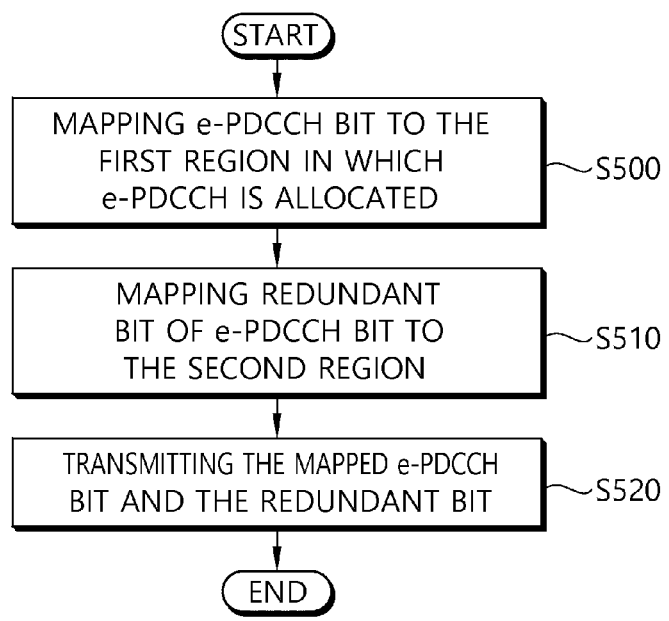
FIG. 15 shows an embodiment of a proposed method for bit mapping for an e-PDCCH.

FIG. 15 shows an embodiment of a proposed method for bit mapping for an e-PDCCH.

In step S500, the base station maps the e-PDCCH bit to the first region to which the e-PDCCH is allocated in the data region within the subframe. In step S510, the base station maps the redundant bit to the second region including at least one OFDM symbol between the control region and the first region within the subframe. In step S520, the base station transmits the mapped e-PDCCH bit and the redundant bit to the UE. The e-PDCCH bit is mapped from the $k^{th}$ OFDM symbol within the subframe in the direction of the increasing OFDM symbol index, and the redundant bit is mapped from the $(k-1)^{th}$ OFDM symbol within the subframe in the direction of the decreasing OFDM symbol index.

Figure 16:
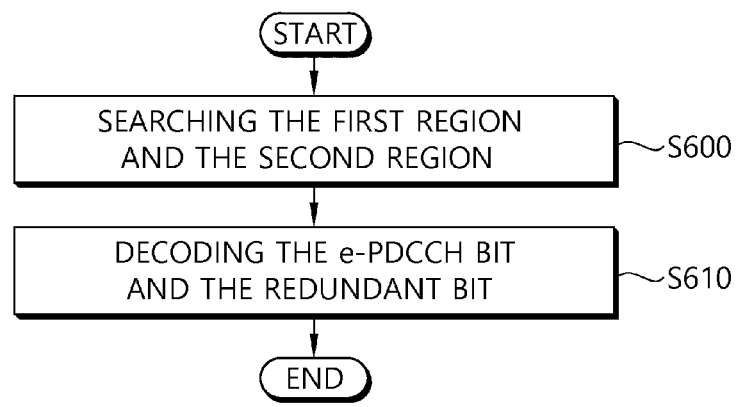
FIG. 16 shows an embodiment of a proposed method for decoding an e-PDCCH.

FIG. 16 shows an embodiment of a proposed method for decoding an e-PDCCH.

In step S600, the UE searches for the first region to which an e-PDDCH is allocated in the data region within the subframe and the second region including at least one OFDM symbol between the control region and the first region within the subframe. In step S610, the UE decodes the e-PDCCH bit and the redundant bit received from the first region and the second region. The e-PDCCH bit is mapped from the $k^{th}$ OFDM symbol in the direction of the increasing OFDM symbol index, and the redundant bit is mapped from the $(k-1)^{th}$ OFDM symbol in the direction of the decreasing OFDM symbol index.

Figure 17:
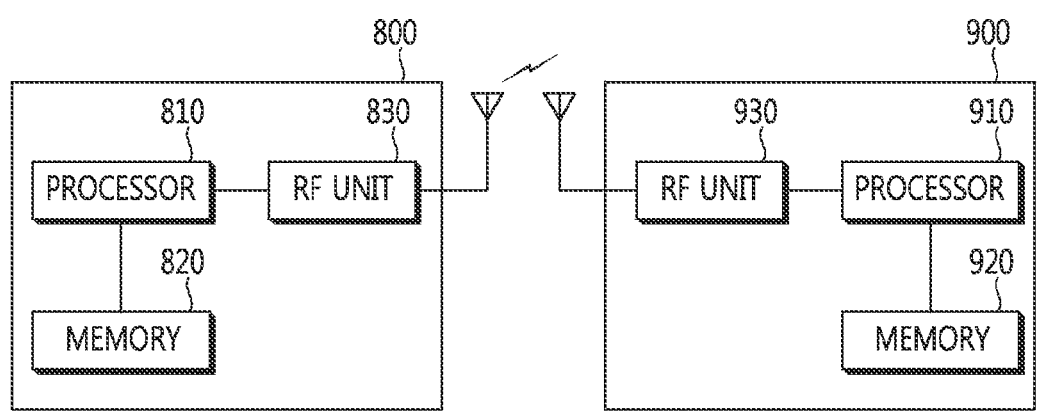
FIG. 17 is a block diagram showing wireless communication system to implement an embodiment of the present invention.

FIG. 17 is a block diagram showing wireless communication system to implement an embodiment of the present invention.

ABS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for mapping, by a base station, a bit of an enhanced physical downlink control channel (e-PDCCH) in a wireless communication system, the method comprising:

mapping an e-PDCCH bit to a first region to which the e-PDCCH is allocated in a data region within a subframe;

mapping a redundant bit of the e-PDCCH bit to a second region including at least one orthogonal frequency division multiplexing (OFDM) symbol between a control region and the first region within the subframe; and transmitting the mapped e-PDCCH bit and the redundant bit to a user equipment, wherein the e-PDCCH bit is mapped from a $k^{th}$ OFDM symbol within the subframe in a direction of an increasing OFDM symbol index, wherein the redundant bit is mapped from a $(k-1)^{th}$ OFDM symbol within the subframe in a direction of a decreasing OFDM symbol index, and wherein the transmission of the mapped e-PDCCH bit and the redundant bit to the user equipment is for allocating a new control channel.

2. The method of claim 1, wherein the redundant bit is a part or a whole part of the e-PDCCH bit.

3. The method of claim 1, wherein the control region occupies first one to three numbers of the OFDM symbols within the subframe.

4. The method of claim 1, wherein k=4.

5. The method of claim 1, wherein the mapping the e-PDCCH bit comprises:
adding a scrambling sequence to the e-PDCCH bit,
generating modulation symbols by performing quadrature phase shift keying (QPSK) modulation on the e-PDCCH bit to which the scrambling sequence is added,
performing a layer mapping and precoding on the generated modulation symbols, and
mapping the modulation symbols to resource elements.

6. The method of claim 1, wherein the mapping the redundant bit comprises:
adding a scrambling sequence to the redundant bit,
generating modulations symbol by performing quadrature phase shift keying (QPSK) modulation on the e-PDCCH bit to which the scrambling sequence is added,
performing a layer mapping and precoding on the generated modulation symbols, and
mapping the modulation symbols to resource elements.

7. A method for decoding, by a user equipment, an enhanced physical downlink control channel (e-PDCCH) in a wireless communication system, the method comprising:
searching a first region to which the e-PDCCH is allocated in a data region within a subframe, and a second region including at least one orthogonal frequency division multiplexing (OFDM) symbol between a control region and the first region within the subframe; and
decoding an e-PDCCH bit and a redundant bit received from the first region and the second region, wherein the e-PDCCH bit is mapped from a $k^{th}$ OFDM symbol within the subframe in a direction of an increasing OFDM symbol index, wherein the redundant bit is mapped from a $(k-1)^{th}$ OFDM symbol within the subframe in a direction of a decreasing OFDM symbol index, and wherein the decoding of the e-PDCCH bit and the redundant bit is for allocating a new control channel.

8. The method of claim 7, wherein the redundant bit is a part or a whole part of the e-PDCCH bit.

9. The method of claim 7, wherein the control region occupies first one to three numbers of the OFDM symbols within the subframe.

10. The method of claim 7, wherein k=4.

11. A base station for mapping a bit of an enhanced physical downlink control channel (e-PDCCH) in a wireless communication system, the base station comprising:
a radio frequency (RF) unit for transmitting or receiving a radio signal, and
a processor coupled to the RF unit, and configured to:
map an e-PDCCH bit to a first region to which the e-PDCCH is allocated in a data region within a subframe;
map a redundant bit of the e-PDCCH bit to a second region including at least one orthogonal frequency division multiplexing (OFDM) symbol between a control region and the first region within the subframe; and
transmit the mapped e-PDCCH bit and the redundant bit to a user equipment,
wherein the e-PDCCH bit is mapped from a $k^{th}$ OFDM symbol within the subframe in a direction of an increasing OFDM symbol index,
wherein the redundant bit is mapped from a $(k-1)^{th}$ OFDM symbol within the subframe in a direction of a decreasing OFDM symbol index, and
wherein the transmission of the mapped e-PDCCH bit and the redundant bit to the user equipment is for allocating a new control channel.

12. The base station of claim 11, wherein the redundant bit is a part or a whole part of the e-PDCCH bit.

13. The base station of claim 11, wherein the control region occupies first one to three numbers of the OFDM symbols within the subframe.

* * * * *